United States Patent [19]

Markus et al.

[11] Patent Number: 4,481,306

[45] Date of Patent: Nov. 6, 1984

[54] POLYMERIZATION PROCESS

[75] Inventors: Michael V. Markus, East Malvern; George H. Barnett, North Balwyn, both of Australia

[73] Assignee: ICI Australia Limited, Victoria

[21] Appl. No.: 482,332

[22] PCT Filed: Aug. 6, 1982

[86] PCT No.: PCT/AU82/00126

§ 371 Date: Mar. 25, 1983

§ 102(e) Date: Mar. 25, 1983

[87] PCT Pub. No.: WO83/00487

PCT Pub. Date: Feb. 17, 1983

[30] Foreign Application Priority Data

Aug. 7, 1981 [AU] Australia ............................ PF0111

[51] Int. Cl.$^3$ ........................ C08F 8/00; C08F 259/08; B01J 1/00
[52] U.S. Cl. .................................. 521/31; 204/159.15
[58] Field of Search .................. 521/31; 204/159.15

[56] References Cited

U.S. PATENT DOCUMENTS 3,839,172 10/1974 Chapiro et al. ..................... 521/31
4,094,826 6/1978 Tatemoto et al. .................... 521/31
4,278,777 7/1981 Jakabhazy et al. ............ 204/159.15
4,385,130 5/1983 Molinski et al. ...................... 521/31

FOREIGN PATENT DOCUMENTS 0032021 7/1981 European Pat. Off. ............. 521/31
5032289 3/1975 Japan .................................... 521/31

Primary Examiner—Joseph L. Schofer
Assistant Examiner—Peter F. Kulkosky
Attorney, Agent, or Firm—Cushman, Darby & Cushman

[57] ABSTRACT

A process of preparing cation exchange resins by radiation grafting with copolymerization onto a perhalogenated fluorine-containing hydrocarbon polymer at least one functional monomer of formula

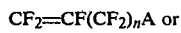

or

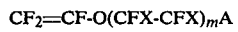

and at least one non-functional monomer of formula $CF_2=CFY$, and optionally in the presence of a polymerization inhibitor and a chain transfer agent.

26 Claims, No Drawings

POLYMERIZATION PROCESS

TECHNICAL FIELD

The present invention relates to novel cation exchange resins, their preparation and their use; in particular it relates to cation exchange materials suitable for use as permselective membranes in electrolytic cells such as are used in the manufacture of alkali metal hydroxide solutions and chlorine.

BACKGROUND ART

Alkali metal hydroxide solutions and chlorine are generally manufactured in mercury cells or diaphragm cells. Mercury cells have the advantage of producing concentrated alkali metal hydroxide solutions but give rise to problems associated with the disposal of mercury-containing effluents. On the other hand, diaphragm cells, in which the anodes and cathodes are separated by porous diaphragms which permit the passage of both positive and negative ions and of electrolyte, avoid the aforesaid effluent problem, but have the disadvantage that:

(1) relatively weak impure alkali metal hydroxide solutions are produced, which results in increased evaporation costs; and
(2) there is a possibility of product gases, namely hydrogen and chlorine, becoming mixed.

Attempts have been made to overcome disadvantages of both mercury cells and diaphragm cells by the use of cells in which the anodes and cathodes are separated by cation-active permselective membranes; these are membranes which are selectively permeable so as to allow the passage of only positively charged ions and not the passage of bulk electrolyte. Cation-active permselective membranes which are suitable for this use in chlorine cells include, for example, those made of synthetic organic copolymeric material containing cation-exchange groups, for example sulfonate, carboxylate and phosphonate.

In particular, synthetic fluoropolymers which will withstand cell conditions for long periods of time are useful, for example, the perfluorosulfonic acid membranes manufactured and sold by E I DuPont de Nemours and Company under the trade mark "NAFION" and which are based upon hydrolyzed copolymers of perfluorinated hydrocarbons (for example polytetrafluoroethylene) and fluorosulfonated perfluorovinyl ethers.

The active sites in the molecular structure of the resins from which these membranes are made are provided by the fluorosulfonated perfluorovinyl ether component. These sites are present on side chains attached by an ether linkage to the skeletal structure of the resin. Such membranes are described for example in U.S. Pat. Nos. 2,636,851; 3,017,338; 3,496,077; 3,560,568; 2,967,807; 3,282,875 and UK Patent No. 1,184,321.

Generally these fluoropolymers are made by the polymerization or copolymerization of fluorocarbon monomers in an emulsion or suspension containing a radical polymerization catalyst. The resulting polymers are moulded into membranes by conventional moulding procedures such as melt fabrication.

DISCLOSURE OF INVENTION

We have now discovered a novel process of making fluoropolymers suitable for use in cation-active permselective membranes. This process differs from the prior art processes in that monomers containing active sites, or functional groups that can be converted to active sites, are grafted directly onto perhalogenated polymeric skeletal substrates by a process of radiation grafting. It is a particular feature of our process that the polymeric skeletal substrates may be in powder or film form.

More particularly, we have found that when a functional monomer as hereinafter defined, a nonfunctional linking monomer as hereinafter defined, and a perhalogenated fluorine-containing hydrocarbon polymer skeletal substrate are together subjected to a radiation grafting process the functional monomer and the nonfunctional linking monomer simultaneously copolymerize and graft to the polymer to form a cation exchange resin having a fluorine-containing hydrocarbon polymeric substrate with pendant side chains containing functional groups. These functional groups may themselves be active sites for cation exchange or may readily be converted to such active site by conventional processes, such as hydrolysis.

Accordingly we provide a process of preparing cation exchange resins which process comprises radiation grafting with copolymerization onto a perhalogenated fluorine-containing hydrocarbon polymeric skeletal substrate at least one functional monomer selected from the group consisting of compounds of formula I:

$$CF_2=CF(CF_2)_nA$$

and formula II:

$$CF_2=CF-O-(CFX-CFX)_mA$$

wherein A is carboxyl, $C_1$ to $C_6$-alkoxycarbonyl, hydroxy-$C_1$ to $C_6$-alkoxycarbonyl, cyano, hydroxysulfonyl, fluorosulfonyl, or the group $-CO-NR^1R^2$ wherein $R^1$ and $R^2$ are independently selected from hydrogen and $C_1$ to $C_6$ alkyl, one X is fluorine and the other X is selected from chlorine, fluorine and a trifluoromethyl group, n is an integer from 0 to 12, m is an integer from 1 to 3; together with at least one non-functional linking monomer selected from the group consisting of compounds of formula III:

$$CF_2=CFY$$

wherein Y is chlorine, fluorine, or a trifluoromethyl group.

The perhalogenated hydrocarbon polymeric skeletal substrate may be perfluorinated or partly fluorinated. A preferred fluorine-containing hydrocarbon substrate is a homopolymer or copolymer of a fluorinated ethylene, especially a homopolymer or copolymer of tetrafluoroethylene or chlorotrifluoroethylene. Typical preferred substrates are polytetrafluoroethylene (PTFE); polychlorotrifluoroethylene (PCTFE) and FEP which is the common name for the copolymer of tetrafluoroethylene and hexafluoropropylene wherein the hexafluoropropylene incorporated in the said copolymer is in the range of 3.5–12.5% w/w.

The preferred functional monomers of formula I for use in our process include pentafluorobutenoic acid, alkyl pentafluorobutenoates such as methyl pentafluorobutenoate and ethyl pentafluorobutenoate, and trifluorovinylsulfonyl fluoride. The preferred nonfunctional linking monomers of formula III are tetrafluoroethylene and chlorotrifluoroethylene.

The mixture of monomeric materials has to be in a liquid form and, if necessary, a common solvent is used to prepare a solution of them. Commonly one of the monomeric materials itself will provide the liquid phase dissolving the other monomeric material. Alternatively, with advantage, the solvent used is one which will penetrate the substrate material and cause it to swell, thereby allowing the solution of monomers to be absorbed right through the substrate material.

Suitable solvents are, for example, toluene and xylene, and chlorinated hydrocarbons such as trichlorotrifluoroethane and oligomers of tetrafluoroethylene, for example, the tetramer and pentamer of tetrafluoroethylene. The substrate material may be pre-swelled with such solvents prior to the addition of the monomers.

Any of the known methods of radiation grafting may be employed. For example, the substrate and monomeric materials may be subjected together to continuous or intermittent radiation, or the substrate may be pre-irradiated prior to bringing it into contact with the monomeric materials. Preferably the substrate and monomeric materials are irradiated together; the substrate, which is a solid and may be in the form of fine particles or as a sheet or film, is immersed in the liquid phase containing the mixed monomeric materials and the whole subjected to irradiation by X-rays. electron beam, or preferably by $\gamma$-rays.

Preferably the grafting process is carried out in the absence of oxygen.

In those cases where a derivative of the active monomer is employed in the grafting process, eg a carboxylic ester such as methyl perfluorobutenoate, subsequent chemical treatment such as hydrolysis is required to convert the derivative into the active carboxylic acid form.

Ion-exchange resins prepared according to the present invention, have enhanced properties particularly as regards resistance to degradation by water uptake during use and find particular application in the form of films as perm-selective membranes in electrolysis cells.

These membranes may be fabricated from particles of resin made by the process of the present invention. Preferably, a perhalogenated fluorine-containing hydrocarbon polymeric film is first made and then this is subjected to the process of the present invention to form a resin of the present invention in the form of a membrane.

Accordingly, in a further embodiment of the present invention, there is provided a perm-selective membrane, suitable for use in electrolysis cells, which comprises a resin having cation exchange properties, wherein the said resin is made by irradiation-induced copolymerization of one or more functional monomers as hereinbefore defined, one or more non-functional linking monomers as hereinbefore defined, to a substrate comprising a perhalogenated fluorine-containing hydrocarbon polymer, thereby forming a resin having a molecular structure consisting of a perhalogenated fluorine-containing hydrocarbon polymeric substrate with side chains comprising at least one active group derived from a functional monomer.

The membranes according to this invention may also be usefully employed in other electrochemical systems, for example, as separators and/or solid electrolytes in batteries, fuel cells and electrolysis cells.

The functional monomers, as hereinbefore defined, by themselves graft very slowly and with low efficiency to the polymeric substrate. In our process the addition of one or more non-functional monomers of formula III greatly increases the rate of grafting of the functional monomers. These non-functional monomers graft, under the polymerization conditions, to both the polymeric substrate and the functional monomer and thus act as linking vinyl groups. Thus the grafted resins formed in our process contain side chains comprising groups formed from the functional monomers ("active groups") and groups formed from the non-functional monomers ("linking vinyl groups").

The preferred ratio of active groups and linking vinyl groups in the side chains of the resins of our invention is in a molar ratio in the range of 2:1 to 1:20, and preferably in the range from 2:1 to 1:3. To achieve these preferred ratios in the resins the range of functional monomers to non-functional monomers in the grafting process is in the range of 9:1 to 1:20, preferably in the range of 4:1 to 1:4, and more preferably, in order to obtain the preferred resins of this invention, are mixed in nearer to equimolar proportions, that is in the range of 2:1 to 1:2.

It is essential for the process of the invention that both the functional monomeric material and the non-functional monomeric material are present together during the grafting process so that the free radicals generated by the radiation may initiate both the grafting of non-functional groups to the substrate and, concurrently, the copolymerization of the functional and non-functional monomeric materials to form the chains which characterize the resins of the present invention.

BEST MODE OF CARRYING OUT THE INVENTION

The radiation grafting/copolymerization of the functional and non-functional linking monomers onto the polymeric substrate appears to be governed by two competing reactions. One of these is the desired copolymerization of the functional monomer with the non-functional linking monomer which is simultaneously grafted onto the polymeric substrate. The second is the copolymerization of monomers particularly the non-functional linking monomers. Since the rate of copolymerization may be greater than the desired grafting-/copolymerization, in a preferred embodiment of the process of radiation grafting with copolymerization the functional and non-functional linking monomers onto fluorine-containing hydrocarbon polymeric substrate, as hereinbeforedefined, we provide the improvement comprising the addition of at least one polymerization inhibitor and at least one chain transfer agent. In this embodiment higher levels of grafting can be achieved; typically the level of grafting is increased by a factor of three or more. The resins from our improved process have higher ion exchange capacity, and when such resins are incorporated into diaphragms for use in electrolytic cells, much better performance is achieved in those cells.

The preferred polymerization inhibitors for use in the process of our invention include, for example, quinone inhibitors such as p-benzoquinone, naphthaquinone, and hydroquinone in the presence of oxygen; inorganic inhibitors such as copper acetate; and compounds such as 2,2,6,6-tetramethyl-4-oxo-piperidine-1-oxide, 2,2,6,6-tetramethylpiperazine-N-oxide and chloranil.

The concentration of inhibitor used in the process of our invention is in the range of 0.001 to 2% w/w of the total mixture of functional and linking monomers and charge transfer agents, preferably in the range of 0.01 to 0.5% w/w.

Since the radiation grafting is preferably carried out in a liquid medium it is preferable that the chain transfer agents are also solvents for the monomers. Preferred chain transfer solvents include, for example, chloroform, carbon tetrachloride, dimethylformamide and mixtures thereof. Suitable mixtures are for example, chloroform, carbon tetrachloride, dimethylformamide and mixtures thereof. Suitable mixtures are for example carbon tetrachloride/chloroform (1:1) and carbon tetrachloride/dimethylformamide (1:9). The concentration of monomers in the chain transfer solvents is in the range of 10–60% w/w, preferably in the range of 30–50% w/w.

Solid chain transfer agents are less preferred since additional solvents may be necessary to provide a liquid medium for the radiation grafting. If solid chain transfer agents are used the w/w ratio of such transfer agents to the monomers should be in the same range as that referred to hereinabove for the preferred chain transfer solvents.

It also lies within the scope of our invention to introduce further cation exchange active groups to the resins, as hereinbefore defined comprising a substrate, functional groups and non-functional groups. The additional active groups are introduced by chemical modification of the groups already present. Thus, for example, the non-functional groups in the side chains may be sulphonated and/or carboxylated to give active resins having enhanced ion exchange capacity and wettability.

INDUSTRIAL APPLICABILITY

Hydrophilic diaphragms, according to the present invention, have enhanced properties particularly as regards wettability by the liquids present in electrolytic cells and therefore they find particular application in electrolysis cells. They may also be usefully employed in other electrochemical systems, for example, as separators in batteries, fuel cells and electrolysis cells.

The invention is now illustrated by, but not limited to, the following examples in which all ion-exchange capacities are those relating to highly alkaline conditions, ie all carboxylic acid and sulfonic acid groups are acting as exchange sites. Unless otherwise stated all parts and percentages are on a weight basis.

The following general procedure was followed. A sample of perfluorinated substrate was placed in a glass reaction vessel, and the monomer mixture added. The contents of the reaction vessel were frozen in liquid nitrogen and placed under vacuum to remove the air present in the system.

After thorough evacuation, the vacuum pump was disconnected and the contents allowed to thaw and reach room temperature. This process, hereinafter referred to as degassing, was repeated three times before sealing the reaction vessel.

Using this technique the contents of the reaction vessel were in a virtually oxygen-free atmosphere. Furthermore, the samples prepared, using this method, were then allowed to equilibrate at selected temperatures for a period of twenty-four hours.

After this time, the reaction vessel was transferred to an irradiation cell room and exposed to γ-rays emanating from a Cobalt-60 source.

After termination of the irradiation, the contents of the glass reaction vessel were frozen in liquid nitrogen prior to opening the reaction vessel. The grafted substrate (film or powder) was washed free of unreacted monomer and homopolymer with a suitable solvent and dried in a vacuum oven at 60° C. to constant weight.

In the Tables and description, the following abbreviations are used:
TFE = tetrafluoroethylene
FEP = copolymer of tetrafluoroethylene and hexafluoropropylene
PFBA = perfluorobutenoic acid
IEC = ion exchange The sizes given are in microns and refer to thickness, in the case of films, and particle size in the case of powders.

The percentage of graft (expressed as the weight increase of the film as a percentage of the weight of the grafted film), the infrared spectra of the grafted film (carbonyl absorption at frequency of 1795 cm$^{-1}$) and the ion exchange capacity (expressed as meq/g) are used to characterize the modified perfluorinated substrate produced by γ-radiation.

The percentage grafting is calculated from the formula:

$$\% \text{ graft} = [(G_i - G_o)/G_i] \times 100$$

where $G_o$ is the initial weight of the polymer substrate and $G_i$ is the weight of grafted polymer after irradiation.

EXAMPLES 1–6

These examples illustrate the grafting of a mixture of functional and non-functional monomers in the presence of a grafting inhibitor α-pinene.

FEP film (2.0 g) placed in a glass reaction vessel and PFBA, α-pinene (0.12 g, 0.5% total concentration), "Arklone" P, water (3.0 g) and ammonium perfluorooctanoate (0.025 g, 0.17% total concentration) were added to the vessel. ("Arklone" is a Registered Trade Mark for 1,1,2-trichloro-1,2,2-tri-fluoroethylene).

The mixture was frozen in liquid nitrogen, the air was evacuated and contents allowed to come to room temperature. This process of degassing was repeated three times, then TFE (free from any inhibitor) was charged into the reaction vessel at liquid nitrogen temperature. The total weight of functional (PFBA) and non-functional (TFE) monomers and solvent ("Arklone" P) was 21 g.

The glass reaction vessel was sealed and kept at room temperature overnight. It was then irradiated at 10 KRAD/hr for 120 hours at ambient temperature. The mixture received a total dose of 1.2 MRAD and it was frozen with liquid nitrogen again, prior to opening the glass vessel. The grafted film was collected, washed free of copolymers and unreacted monomers and dried in vacuum oven at 60° C.

Various ratios of functional monomer, non-functional monomer and solvent, were used.

The infra-red spectra of the grafted films showed the carbonyl absorption frequency to be 1795 cm$^{-1}$ and its ion exchange capacity determined by titration was 0.2 meq/g. The ratios used, the percentage grafting, and the ion-exchange capacities are given in Table 1.

TABLE 1

| Example | Functional monomer | Non-functional monomer | Solvent | % Graft | IEC (meq/g) |
|---|---|---|---|---|---|
| 1 | 37.5 | 12.5 | 50.0 | 49.6 | 0.22 |
| 2 | 25.0 | 25.0 | 50.0 | 58.6 | 0.18 |
| 3 | 12.5 | 37.5 | 50.0 | 78.0 | 0.08 |
| 4 | 50.0 | 16.7 | 33.3 | 44.6 | 0.25 |
| 5 | 60.0 | 20.0 | 20.0 | 40.7 | 0.29 |
| 6 | 75.0 | 25.0 | — | 52.1 | 0.34 |

*the concentration in these tables is expressed as a percentage of the total weight of functional and non-functional monomers and the solvent.

EXAMPLES 7-13

The procedure of Example 4 was repeated except that the total absorbed radiation dose was varied as shown in Table 2 where the results are tabulated.

TABLE 2

| Example | Absorbed Dose | % Grafting | IEC (meq/g) |
|---|---|---|---|
| 7 | 1.20 | 40.7 | 0.30 |
| 8 | 1.75 | 47.5 | 0.36 |
| 9 | 3.50 | 51.8 | 0.41 |
| 10 | 10 | 68.5 | 0.41 |
| 11 | 30 | 68.5 | 0.32 |
| 12 | 75 | 72.7 | 0.24 |
| 13 | 180 | 88.6 | 0.12 |

EXAMPLES 14-20

The procedure of Example 6 was repeated except that the total absorbed radiation dose was varied as shown in Table 2 where the results are tabulated.

| Example | Absorbed Dose (MRad) | % Graft | IEC (meq/g) |
|---|---|---|---|
| 14 | 1.20 | 52.1 | 0.35 |
| 15 | 1.75 | 58.4 | 0.41 |
| 16 | 3.50 | 63.4 | 0.44 |
| 17 | 10 | 68.4 | 0.44 |
| 18 | 30 | 75.1 | 0.34 |
| 29 | 75 | 81.4 | 0.26 |
| 20 | 180 | 96.8 | 0.09 |

We claim:

1. A process of preparing a cation exchange resin which process comprises radiation grafting with copolymerization onto a perhalogenated fluorine-containing hydrocarbon polymeric skeletal substance at least one functional monomer selected from the group consisting of compounds of formula I:

$$CF_2=CF(CF_2)_nA$$

and formula II $$CF_2=CF-O-(CFX-CFX)_mA$$

wherein A is carboxyl or $C_1$ to $C_6$ alkoxycarbonyl, one X is fluorine and the other X is selected from chlorine, fluorine and a trifluoromethyl group, n is an integer from 0 to 12, m is an integer from 1 to 3; together with at least one non-functional linking monomer selected from the group consisting of compounds of formula III:

$$CF_2=CFY$$

wherein Y is chlorine, fluorine, or a trifluoromethyl group, the molar ratio of functional monomer to non-functional linking monomer being in the range of 9:1 to 1:20, said grafting being carried out with said mixture of monomers in the presence of at least one polymerization inhibitor and at least one chain transfer agent, such that at least 40.7 percent grafting is accomplished.

2. A process according to claim 1 wherein the fluorine-containing polymeric skeletal substrate is a homopolymer or copolymer of a fluorinated ethylene.

3. A process according to claim 2 wherein the fluorinated ethylene is tetrafluoroethylene.

4. A process according to claim 2 wherein the fluorinated ethylene is chlorotrifluoroethylene.

5. A process according to claim 2 wherein the copolymer comprises hexafluoropropylene units.

6. A process according to claim 3 wherein the fluorine-containing polymeric skeletal substrate is polytetrafluoroethylene.

7. A process according to claim 4 wherein the fluorine-containing polymeric substrate is polychlorotrifluoroethylene.

8. A process according to claim 2 wherein the fluorine-containing polymeric substrate is a copolymer of tetrafluoroethylene and hexfluoropropylene wherein the hexafluoropropylene incorporated in the said copolymer is in the concentration range of 3.5–12.5% w/w.

9. A process according to any claim 1 wherein the compounds of formula I and II are pentafluorobutenoic acid and $C_1$ to $C_6$ alkyl pentafluorobutenoates.

10. A process according to claim 9 wherein the said $C_1$ to $C_6$ alkyl pentafluorobutenoates are methyl pentafluorobutenoate and ethyl pentafluorobutenoate.

11. A process according to claim 1 wherein the non-functional monomers of formula III are tetrafluoroethylene and chlorotrifluoroethylene.

12. A process according to claim 1 wherein the molar ratio of functional monomer to non-functional monomer is in the range of 9:1 to 1:20.

13. A process according to claim 12 wherein the said molar ratio is in the range of 4:1 to 1:4.

14. A process according to claim 12 wherein the said molar ratio is in the range of 2:1 to 1:2.

15. A process according to claim 1 wherein the radiation grafting is by irradiation by any one form of radiation selected from the group consisting of γ-rays, X-rays and electron beams.

16. A process according to claim 1 wherein the mixture of monomers is dissolved in a solvent capable of swelling the substrate.

17. A process according to claim 1 wherein before addition of the monomers the diaphragm is treated with a solvent capable of swelling the diaphragm.

18. A process according to claim 16 wherein the solvent is selected from the group consisting of toluene, xylene, trichlorotrifluoroethane and oligomers of tetrafluoroethylene.

19. A process according to claim 1 wherein the polymerization inhibitor is selected from the group consisting of p-benzoquinone, naphthaquinone, hydroquinone in the presence of oxygen, copper acetate, 2,2,6,6-tetramethyl-4-oxopiperidine-1-oxide, 2,2,6,6-tetramethylpiperazine-N-oxide, and chloranil.

20. A process according to claim 1 wherein the polymerization inhibitor is in the concentration range of 0.001 to 2% w/w of the total mixture of monomers and charger transfer agent.

21. A process according to claim 20 wherein the concentration range is 0.01 to 0.5% w/w.

22. A process according to claim 1 wherein the chain transfer agent is a solvent selected from the group consisting of chloroform, carbon tetrachloride, dimethylformamide and mixtures thereof.

23. A process according to claim 1 wherein the concentration of the monomers in the chain transfer solvent is in the range of 10 to 60% w/w.

24. A process according to claim 23 wherein the said range is 30–50% w/w.

25. A cation exchange resin made by the process of claim 1.

26. A perm-selective membrane made from the resin of claim 26.

* * * * *